Sept. 13, 1966    H. J. HOUSTON    3,272,249
LOCKING DEVICE FOR USE ON SUSPENSION CLAMPS AND THE LIKE
Filed July 30, 1964

United States Patent Office 3,272,249
Patented Sept. 13, 1966

3,272,249
LOCKING DEVICE FOR USE ON SUSPENSION CLAMPS AND THE LIKE
Herbert J. Houston, Oakville, Ontario, Canada, assignor to Slater Steel Industries Limited, Hamilton, Ontario, Canada
Filed July 30, 1964, Ser. No. 386,129
Claims priority, application Canada, Sept. 9, 1963, 884,111
2 Claims. (Cl. 151—6)

This invention relates generally to a locking device for a bolt assembly. More particularly, the invention relates to a spring loaded locking arrangement which is adapted for use with a bolt to prevent complete displacement of the bolt from its associated assembly but which at the same time, may be easily dislodged to allow complete removal of the bolt from its normal operating position.

Various spring loaded devices have been employed to lock bolts into position or prevent complete removal of bolts from a nut or other body. For example, United States Patent 599,783 describes and claims a spring loaded rod mounted within a bolt, the rod being adapted to fit into a recess in the nut when the bolt is turned so as to lock the two together. Another type of lock nut is disclosed in United States Patent 1,881,749 which shows a resilient member mounted within a screw and flexed upon engagement with the root of a complementary internal thread thereby restraining the screw from further disengagement.

Generally speaking, prior art locks as exemplified by the above two patents suffer from the disadvantages that they are difficult to disengage when desired and also that they are comparatively difficult to manufacture.

It is apparent that there is definite need for a bolt locking assembly for cables and the like which would not only permit ready manipulation of the bolt but which would also act to prevent accidental removal of the bolt. For example, linemen who are responsible for the installation and maintenance of overhead electric wires find that bolts are frequently dropped accidentally during their adjustment of a wire clamping assembly. This is particularly the case when operating in sub-zero temperatures.

The need for a simple and efficient means for preventing accidental and complete displacement of a bolt from its associated clamping assembly is therefore apparent.

A main object of this invention is to fill this need.

According to the invention a locking assembly for preventing the complete detachment of one member from another comprises a male member and a female member having a threaded wall and adapted to receive the male member in screw threaded engagement, a spring actuated locking element housed within said male member and held in normally closed position by said threaded wall, the continuous annular thread of said wall terminating in a recess dimensioned to receive said element in locking engagement, whereby upon release of the male member to a predetermined extremity said element is urged outwardly of the axis of the female member and into locking engagement with said recess, thereby preventing further unscrewing of the assembly.

The invention is more readily understood from the drawings in which.

Figure 1:
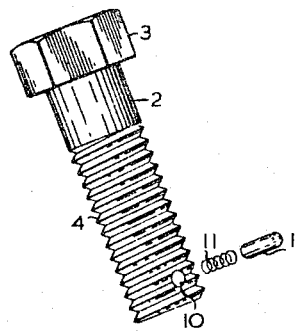
FIG. 1 is an exploded view of a bolt and associated locking elements.
Figure 2:
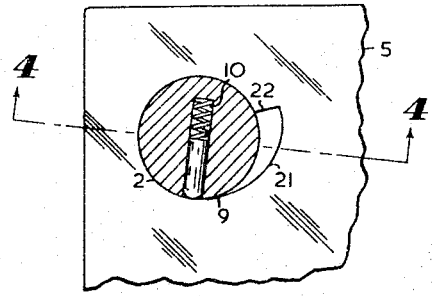
FIG. 2 is a sectional plan view of a cable clamping assembly showing the locking elements in the bolt when the bolt has been threaded into the assembly.
Figure 3:
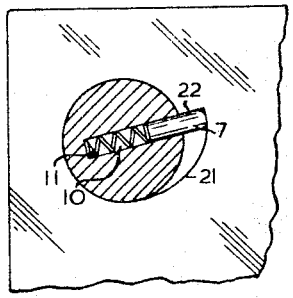
FIG. 3 is a plan view showing the locking elements in a position which prevents complete disengagement of the bolt.
Figure 4:
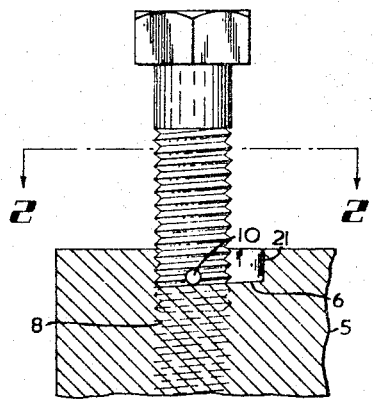
FIG. 4 is a view along line 4—4 of FIG. 2 in partly cut-away side elevation of a preferred embodiment of the invention.
Figure 5:
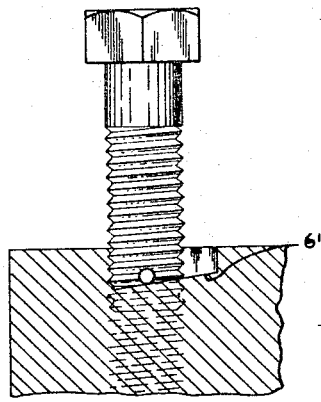
FIG. 5 is a view similar to FIG. 4 showing a second embodiment of the invention.

In FIG. 1 a bolt 2 is shown with head 3, threads 4 and the provision of a hole 10. Locking elements comprising a spring 11 and pin 7 are shown exploded across the axis of the recess. In normal non-locking usage, as in FIG. 2, the spring and pin are compressed into hole 10 when the bolt is threaded into the clamp body 5. As shown in FIGS. 4 and 5, the clamp body has a machined shoulder 6 extending away from the threads 8 formed within the body. FIGS. 2 and 3 illustrate the arc-shaped recess 21 of the shoulder. One end of the recess forms a point of re-entry at 9 to the interior threads while the other end of the arc and shoulder terminates in wall 22.

When the bolt is unscrewed almost to its full extremity, and specifically to the position of the hole 10 shown in FIG. 1, the locking elements will come into operation. This occurs when the hole 10 coincides with the shoulder 6, and is best shown in FIG. 3. At this point the threaded wall of body 5 will no longer exert a retaining force on the spring 11 and pin 7, and the pin will be urged onto the shoulder 6 by the action of the spring 7 as shown in FIG. 3. If the bolt is then turned as though to screw it back into the body 5, the arcuately shaped side wall of the recess 21 will contact the outer end of the pin and—as the bolt is rotated—gradually urge the pin back into the hole 10 into non-locking engagement in the body 5. If, on the other hand, the bolt is unscrewed even further, it will carry the then projecting pin 7 along the shoulder 6 until the pin contacts wall 22 and further unscrewing is thus prevented. The only way in which the bolt could be further unscrewed would be if the unscrewing force exceeds the shear strength of the pin 7. As a practical matter this is not likely to happen.

In another embodiment of this invention, as illustrated in FIG. 5, the shoulder 6' is shown having an inclination slightly greater than the pitch of the threads. Consequently, the pin 7 will frictionally engage the shoulder 6' rather than allowing the bolt to freely rotate (as in FIG. 3) until the pin contacts wall 22. The shoulder in FIG. 4 allows for this aspect of free rotation.

Other variations of a spring loaded pin are possible of course. For example the pin 7 could be completely replaced by a spring constructed and arranged to serve the same function as the spring and pin arrangement.

To remove the bolt, the pin is manually depressed into the recess and the bolt unscrewed until the hole 10 passes beyond the wall 22.

I claim:
1. A locking assembly for preventing the complete detachment of one member from another, said assembly comprising an externally threaded male member and a female member having an internally threaded wall and adapted to receive the male member in screw threaded engagement, a resiliently actuated locking element housed within said male member adjacent the threaded inner end thereof and held in normally closed position by said threaded wall, a recess formed in the exterior face of said female member, said recess being flared and generally segmental in shape, and terminating in a retaining wall for said element generally radially outwardly extending from the threaded wall and interrupting the thread of said female member, the distance measured from the threaded inner end of said male member to said locking element being greater than the depth of said recess by at least one thread turn, said recess adaptable to receive said element in locking engagement whereby upon retrograde movement of the male member to a predetermined extremity said element is urged outwardly of the axis of the male member and into locking engagement with said recess, thereby preventing further unscrewing of the assembly.

2. The locking element of claim 1 comprising a spring actuated pin housed within the male member.

References Cited by the Examiner
UNITED STATES PATENTS

| | | | |
|---|---|---|---|
| 1,693,975 | 12/1928 | Cordley | 151—24 |
| 2,209,007 | 7/1940 | Stevenson | 151—6 |
| 2,706,525 | 4/1955 | Ruppert | 151—69 |

CARL W. TOMLIN, *Primary Examiner.*

M. PARSONS, Jr., *Assistant Examiner.*